(12) United States Patent
Wyland

(10) Patent No.: US 6,351,806 B1
(45) Date of Patent: Feb. 26, 2002

(54) RISC PROCESSOR USING REGISTER CODES FOR EXPANDED INSTRUCTION SET

(75) Inventor: David C. Wyland, Morgan Hill, CA (US)

(73) Assignee: Cradle Technologies, Fremont, CA (US)

( * ) Notice: Subject to any disclaimer, the term of this patent is extended or adjusted under 35 U.S.C. 154(b) by 0 days.

(21) Appl. No.: 09/679,962

(22) Filed: Oct. 5, 2000

Related U.S. Application Data

(60) Provisional application No. 60/158,168, filed on Oct. 6, 1999.

(51) Int. Cl.[7] .................................................. B06F 7/38
(52) U.S. Cl. ........................ 712/225; 712/204; 712/205; 712/215; 712/226
(58) Field of Search ................................ 712/225, 226, 712/214, 215, 205, 204; 710/33

(56) References Cited

U.S. PATENT DOCUMENTS

| | | | |
|---|---|---|---|
| 5,041,968 A | 8/1991 | Yamaguchi | 364/200 |
| 5,371,711 A | 12/1994 | Nakayama | 361/230.03 |
| 5,381,531 A | 1/1995 | Hanawa et al. | 395/375 |
| 5,440,701 A | 8/1995 | Matsuzaki et al. | 395/375 |
| 5,566,313 A | 10/1996 | Yamamura | 395/412 |
| 5,568,624 A | 10/1996 | Sites et al. | 395/375 |
| 5,680,568 A | 10/1997 | Sakamura | 395/421.1 |
| 5,680,632 A | 10/1997 | Studor et al. | 395/800 |
| 5,751,991 A | 5/1998 | Leach et al. | 395/421.04 |
| 5,758,140 A * | 5/1998 | Kahle et al. | 712/227 |
| 5,758,195 A | 5/1998 | Balmer | 395/898 |
| 5,778,423 A | 7/1998 | Sites et al. | 711/118 |

* cited by examiner

*Primary Examiner*—Mark Zimmerman
*Assistant Examiner*—Mackly Monestime
(74) *Attorney, Agent, or Firm*—Thomas Schneck

(57) ABSTRACT

A RISC processor using a fixed length standard instruction word (32-bit) consisting of a fixed-length (6-bit) operation code and two register fields, uses one of the register fields to give certain operation codes multiple meanings. For most operations, the register codes refer to general purpose registers as such. However, for certain operations, including move and add, register codes 30 and 31 in the source register code field of the instruction word indicate that the next instruction word contains immediate data for that operation instead of the operand being located in the specified register itself. Further, for load, store and jump operations, the source register codes 30 and 31 in the source register code field indicates that those registers are to be used as base or index registers for indexed addressing, with an offset in the following instruction word added to the general purpose register 30 or 31 contents to form the address. And, for load and store operations, register codes 24 through 27 in the source register field indicate various forms of byte (8-bit) or half-word (16-bit) memory transfers instead of a word (32-bit) transfer. All other register codes indicate normal operation using the designated general purpose register, and the noted register codes indicate normal operation when found in the second register field or in any other operation.

20 Claims, 2 Drawing Sheets

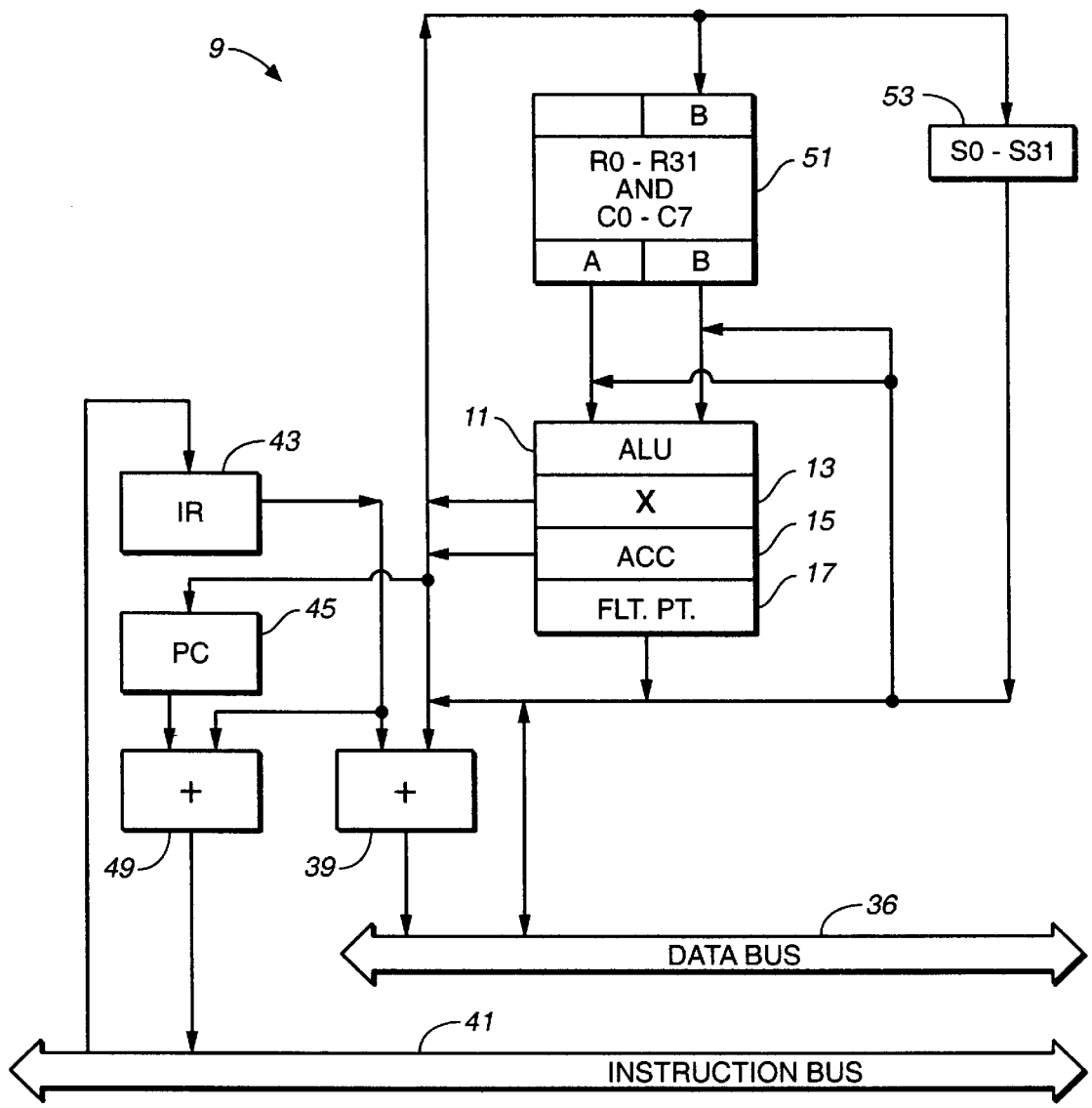
FIG._1

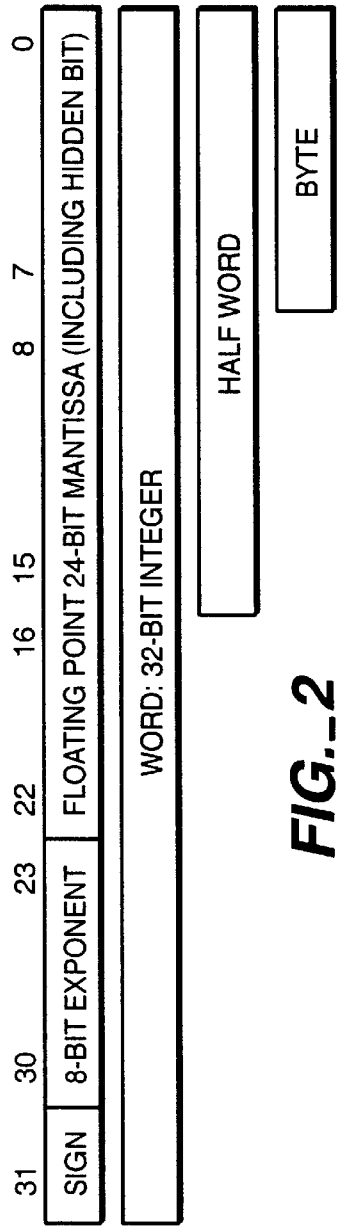
FIG._2
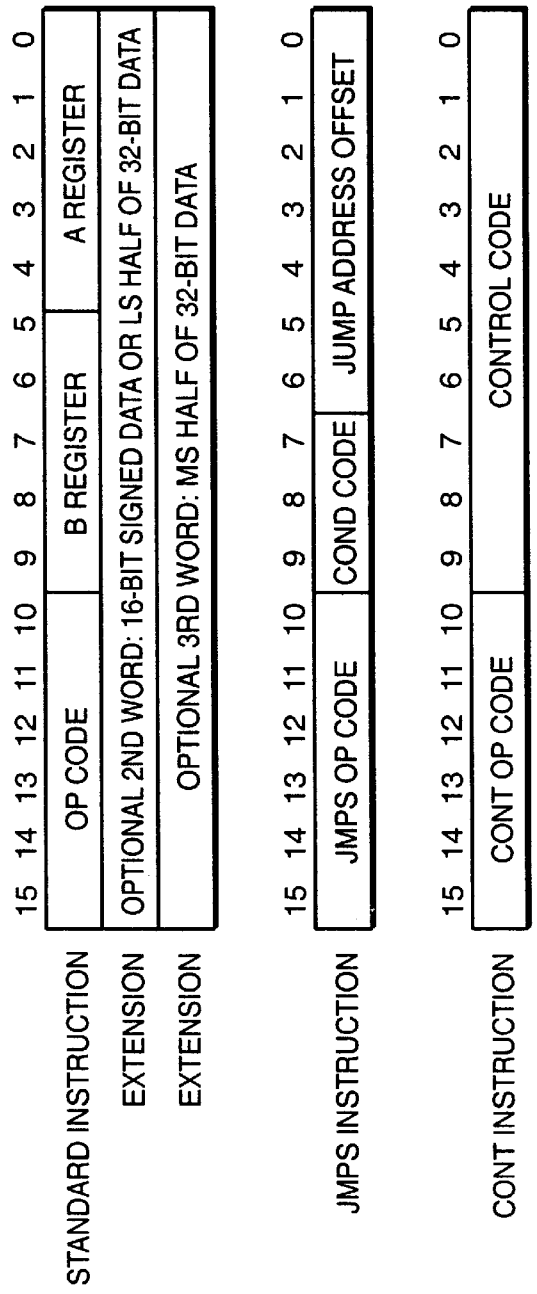
FIG._3

RISC PROCESSOR USING REGISTER CODES FOR EXPANDED INSTRUCTION SET

CROSS-REFERENCE TO RELATED APPLICATION

This application claims priority from U.S. provisional application No. 60/158,168, filed Oct. 6, 1999.

TECHNICAL FIELD

The present invention relates to data processing circuits with a limited size (e.g. 16-bit) instruction register and a limited number of operation codes (e.g., 64 six-bit codes), and to techniques for expanding the instruction set.

BACKGROUND ART

U.S. Pat. No. 5,440,701 to Matsuzaki et al. disclose a data processing apparatus in which an instruction having an operation code (4-, 6- and 8-bits) and two register designation codes is decoded, and in some cases the instruction execution device executes a first process when the register designation codes are different but executes a second process when the register designation codes are equal.

U.S. Pat. No. 5,568,624 to Sites et al. disclose a RISC processor having a fixed (32-bit) instruction size with 6-bit operation codes in which a limited instruction set, permitting only simplified memory access data width and addressing modes, includes byte manipulation instructions, non-aligned load and store instructions, and load/locked and store/conditional instructions for implementing atomic byte writes.

Normally, each type of instruction requires its own operation code, and different addressing modes, special data formats (e.g. byte, half-word, word), and the presence of immediate data are indicated with different operation codes. However, in a Reduced Instruction Set Computer, RISC, processor, the number of operation code, op code, instructions is limited, and only the most basic op code instructions are included.

It is an objective of the invention to expand the number of operations, i.e., the instruction set, of a RISC processor, without adding more op code instructions to its official op code list.

It is another object of the present invention to expand the operations of existing op code instructions to handle immediate data, byte and half-word load and store operations and indexed-addressed load, store and jump operations.

DISCLOSURE OF THE INVENTION

The objective is met by employing special registers codes to designate the additional operations. For example, when certain operations, such as ADD or MOV, are applied to these special registers, the processor's response to these op code instructions will be modified to use immediate data following in the next instruction word. Thus, if the register code for a special general register is found in the instruction's source register code field, the register itself may be ignored and the processor may wait for substitute immediate data expected in one or more extended words. In certain memory reference operations, such as load, store or jump, the code for a special general register in the instruction's source register field is used to indicate that these registers are to be used as base or index registers for indexed addressing. Still other special register codes may mean that a load or store operation is to be executed as byte (8-bit) or half-word (16-bit), instead of word (32-bit), memory transfers. When the special register codes are used with any other op code instruction not predefined to have additional functionality, the special general register will behave like any other non-special general register. Similarly, when a non-special register is used, in a special op code instruction with extended functionality, the non-special register is interpreted as a normal general purpose registers containing operand data or direct memory addresses.

The use of these special register codes has been found to not significantly reduce the availability of general purpose registers, while providing multiple functionality to certain operation code instruction, thereby extending the available number of operations without expanding the size of the op code instruction size.

BRIEF DESCRIPTION OF THE DRAWINGS

FIG. 1 shows a general purpose processor, having a bank of general and special purpose registers, which is suitable for implementing the expanded instruction set technique of the present invention.

FIG. 2 shows the preferred data formats for use in a processor in accord with the present invention.

FIG. 3 shows the preferred instruction formats for use in a processor in accord with the present invention.

BEST MODE FOR CARRYING OUT THE INVENTION

Preferably, the present invention is applied to a 32-bit general purpose processor with interrupts, and preferably the 32-bit processor is part of a plurality of identical processors on a single integrated circuit. Therefore, if the op code instruction set in one processor is increased, the op code instruction sets of all other processors must likewise be increased. Thus, all processors have a limited and generally small op code instruction set.

With reference to FIG. 1, a general purpose processor 9 suitable for use with the present invention preferably includes an arithmetic logic unit (ALU) 11, a 32-bit multiplier 13, an accumulator 15, a single-precision (32-bit) floating-point logic 17, and plurality of adders 49, 39. General purpose processor 9 preferably uses a Harvard architecture, with separate data and instruction memories (not shown) accessed via respective data and instruction buses 36 and 41. Processor 9 is a 32-bit machine with a bank of 32 general purpose registers R0 to R31. Although the instruction set of processor 9 is defined to process both fixed and 32-bit floating point data, the functionality of the instruction set is expanded to accommodates 8-bit, 16-bit and 32-bit data formats. It also has instructions for efficient processing of bit string data, such as found in Huffman decoding.

In addition to the 32 general purpose registers R0 to R31, processor 9 includes eight cluster hardware registers C0 to C7 housed within the same dual port registry file 51. The general purpose registers R0 to R1 are 32-bit registers that can be used as data and address registers. The cluster hardware registers C0 to C7 provide control, status and interrupt information for other devices.

Processor 9 also has several special purpose registers, such as a bank 53 of special purpose hardware registers S0 to S31 to provide special functions outside the general purpose registers set. Examples of these special functions are system register functions such as a Processor Status Word (PWS), a hardware breakpoint register, shadow registers for interrupts, etc. Additionally included in processor 9 are other standard hardware registers such as an instruction register, IR, 43 and program counter register, PC, 45. During a jump to subrouting instruction, the incremented (PC+1 instruction) contents of the PC are saved in general register R16. This is the default return address for the subroutine.

With reference to FIG. 2, the processor of the resent invention is preferably capable of using 8-bit byte, 16-bit half-word and 32-bit word data. Within memory, however, all addresses are byte addresses, and all instructions and operands are naturally aligned. Word, half-word and byte data is aligned on 32-bit, 16-bit and 8-bit boundaries, respectively. The 32-bit formats include 32-bit integer and 32-bit floating point formats. The 8, 16 and 32-bit integer formats are 2's complement formats. The floating point format has a 24-bit sign magnitude mantissa (bits 0 to 22 and bit 31) and an 8-bit 2's complement exponent with an offset of 128 (bits 30 to 23). The mantissa has a hidden most significant bit that is always a one for valid, normalized floating point numbers. This floating point format follows the x86 floating point format.

With reference to FIG. 3, the general processor of the present invention preferably uses 16-bit instructions aligned on 16-bit boundaries. Each instruction is 16 bits long consisting of a 6-bit op code and 10 bits of modifiers. Thus, the instruction set has a maximum of 64 different op codes, and a preferred set of 58 op codes, with six spare op codes for future use. The standard instruction uses a 5-bit A register field and a 5-bit B register field.

Generally, load and store operations transfer 32-bit words from, and to, the data memory. The 32-bit data words are word aligned, and the two least significant bits of the address are ignored. This is because memory addresses are arranged in byte addresses, and a 32-bit word spans four bytes. Ignoring the two least significant bits permits the processor to sequence through the data memory in four-byte blocks.

Special instructions can have one or two extension words for address or data, as determined by the operation code and the A field value. If the instruction is expecting a 16-bit half-word, then it would be supplied by a single 16-bit extension word. If the instruction is expecting a 32-bit word, then it is supplied in two consecutive extension words. The first optional extension word would contain the least significant half of the expected 32-bit word, and the second optional extension word would contain the most significant half of the 32-bit word.

For the most part, instructions follow this standard instruction format, but the JMPS and CONT instruction are two exceptions. The conditional short jump, JMPS, (op code 40) instruction has a 6-bit op code, a 3-bit jump condition code to select a condition for the jump, and a 7-bit jump address offset to be added to the byte address in the program counter register PC. The control instruction, CONT, (op code 45) has a 6-bit op code and a 10-bit control code field to indicate the control action: interrupts and waits, instructions and data cache enables and disables, etc.

Thus, the preferred processor is a two address machine, with the A and B registers identified by the register fields. Arithmetic operations are the form: A Register Operator B Register to B Register. For example, an ADD instruction adds the contents of register A to the contents of register B, and the result is stored in register B. Additionally included in the instruction set are instructions for register to register move and combine, register load and store, register shift, bit operations, and jump operations.

With only a limited number of available op code instructions, and no available op code instruction for byte operations, some of the available general purpose registers R0 to R31 and available special hardware registers S0 to S31 have been used as key words or special function registers in selected available op code instructions. Specifically, general purpose registers R24 and R25 are used to indicate byte operations, and are used to load and store bytes when used as data registers in load and store instructions. General registers R26 and 27 indicate half-word operations, and are used to load and store half-words when used as data registers in load and store instructions. When these registers are used as half-word registers, the 16-bit data in memory is assumed be half-word aligned, and the least significant bit of the address is ignored. Since data memory is addressed in bytes and a half-word consists of two bytes, ignoring the least significant bit of the address allows the processor to move through the memory in two-byte blocks.

General purpose registers R30 and 31 indicate the use of immediate data or of a base indexed address in certain instructions. Depending on the op code instruction, the immediate data indicated by R30 and R31 may be taken directly from their contents or from external memory. In the cases when R30 and R31 signal that the immediate data will come from external memory, it is not possible to gain access to the contents of R30 and R31 directly. Therefore, special hardware registers S30 and S31 have been reserved to function as mirror storage locations for R30 and R31, respectively. In the cases when it is not possible to gain access to the contents of R30 and R31, one may obtain the contents of R30 and R31 by accessing their mirror storage in respective hardware registers S30 and S31.

Thus, special purpose registers R24–R27 and R30–R31 assume extended functionality when used within predefined special op code instructions, but in all other operations, R24–R27 and R30–R31 function as normal 32-bit general purpose registers and offer no distinction between themselves and the other general purpose registers R0–R23 and R28–R29.

As stated above, general purpose registers R24 and R25 can functions as byte registers and R26 and R27 can function as 16-bit half-word registers for load and store operations. When any of the R24–R27 registers is specified as a B field registers for load or store operations, the appropriate byte or half-word will be loaded or stored. All other registers transfers 32-bit words in load or store operations. General registers R24 and R26 load unsigned byte and half-word data, respectively, where the upper bits of the 32-bit word are zeros. General registers R25 and R27 load signed byte and half-word data, respectively, where the sign of the byte or half word is extended to the upper bits of the 32-bit word. If a post increment load or store, LD++ or ST++, is used, the A address will be incremented by 1, 2, or 4 corresponding to whether the transfer is byte, half word or word. If load or store base indexed instructions such as LDB0 are used, the A field index value will be shifted appropriately. It will be shifted by 0, 1, or 2 bits before added to the base register for the byte, half-word or word mode, respectively.

As explained above, general purpose register codes R30 and R31 can be used to indicate special addressing modes when used within predefined op code instructions. The meaning of R30 and R31 will be interpreted differently depending on the type of operation. For example, when R30 or R31 is used as a data or address source, general register R30 indicates that its contents should be ignored and that a 16-bit data half-word will follow in an instruction extension word. The 16-bit data extension word is used in place of R30. Similarly, use of general register R31 indicates that its contents should be ignored in favor of a 32-bit data word that will follow in two instruction extension words. The 32-bit data word is used in place of R31.

By contrast, when general purpose registers R30 and R31 are used in arithmetic instructions, such as MOV and ADD, the use of R30 and R31 in the A field indicates that 16-bit and 32-bit immediate data, respectively, will be provided. The 16-bit data is sign extended into a 32-bit integer. It should be noted that use of R31 to gain access to 32-bit immediate data and 32-bit base index values preferably assumes little-endian, least significant word first alignment. For instance, an "MOV A31 B5" instruction will move a 32-bit immediate data value following the instruction to register R5. The format in memory will be: instruction, least significant 16-bits, most significant 16-bits. In the above MOV instruction, the "R" indicating a general purpose register R0–R31 is replaced by either an "A" or a "B" to indicate the A-field and B-field of the instruction. Since the use of R30 and R31 in a MOV instruction indicates that it should be ignored in favor of an expected 16-bit or 32-bit data word, it is not possible to access the contents of R30 and R31 directly. Therefore, the contents of R30 and R31 are mirrored in the Special Hardware registers as S30 and S31. To copy data from R30 or R31 to another register, one can use a Move-from-Special-to-General-Register (MSG) instruction referencing S30 or S31 as the source.

To assure proper functionality, some restrictions are placed on the use of R30 and R31. Arithmetic operations are performed register to register or immediate data to register using register codes 30 or 31 (indicating R30 and R31 respectively) for the A register field. In arithmetic instructions, general purpose registers R30 and R31 can be used in the B field as a destination, but cannot be used as a source. In memory reference instructions such as LD and JUMP, register codes of 30 and 31, provide base indexed addressing relative to R30 and R31, respectively. An A field code of 30 provides a 16-bit signed offset to R30 as a base register, and an A field code of 31 provides a 32-bit unsigned offset to R31 as a base register. If R30 and R31 is used in post increment instructions such as LD++, the selected base register, R30 and R31, is incremented.

Thus general registers R30 and R31 extend the functionality of various arithmetic and addressing op code instructions to access immediate data from external memory and not from R30 or R31. However, R30 and R31 function as regular general purpose registers when used in op code instructions that already indicate that immediate data from external memory will be accessed. For example, the add-external instruction, ADDX, adds the contents of the A-field register to a 16-bit signed constant in the second word of the instruction and puts the result in B-field register. The ADDX instruction does not interpret A30 or A31 as special R30 or R31 immediate codes, and A30 and A31 are treated as normal registers referring to R30 and R31, respectively. This allows the use of the ADDX instruction to generate R30 and R31 based pointer values and store these pointers in another register.

What is claimed is:

1. In a processor having a plurality of general purpose registers and an instruction register for holding a currently executed instruction, each of said general purpose registers having a register code, said processor being coupled to a memory, said processor having an instruction set, at least an instruction of said instruction set having an operation code (opcode), a destination field, and a source field, said opcode being unique for said instruction, said destination field selecting the content of a first general purpose register as the destination operand for said instruction, said source field selecting the content of a second general purpose register as the source operand for said instruction, a method of specifying a new source for operands besides said general purpose register for said instruction, said method comprising the steps of:

loading said instruction into said instruction register; and upon recognizing a pre-specified bit pattern in said instruction, outside said opcode field, in said instruction register, fetching immediate data from said memory to be used as an operand for said instruction.

2. The method of claim 1 wherein said recognizing a pre-specified bit pattern comprises recognizing the register code of a third general purpose register, said third general purpose register being pre-specified.

3. The method of claim 2 wherein said recognizing the register code of a third general purpose register comprises recognizing the register code of said third general purpose register in said source field of said instruction.

4. The method of claim 3 further comprising the steps of:

providing a special purpose register having a copy of the content of said third general purpose register; and accessing said special purpose register to indirectly obtain the content of said third general purpose register.

5. The method of claim 3 wherein said fetching immediate data comprises fetching said immediate data located next after said instruction in said memory.

6. The method of claim 5 wherein said recognizing a pre-specified bit pattern comprises recognizing the register code of a fourth general purpose register, said fourth general purpose register being pre-specified.

7. The method of claim 1 wherein said fetching immediate data comprises fetching said immediate data located next after said instruction in said memory.

8. The method of claim 7 wherein said recognizing a pre-specified bit pattern comprises recognizing the register code of a fourth general purpose register, said fourth general purpose register being pre-specified.

9. The method of claim 8 wherein said fetching immediate data from said memory comprises transferring a number of bytes, said number depending on said pre-specified bit pattern.

10. The method of claim 9 wherein said transferring a number of bytes comprises the steps of:

transferring one byte if said bit pattern is the register code of a fifth general purpose register;

transferring two bytes if said pre-specified bit pattern is the register code of a sixth general purpose register; or transferring four bytes if said pre-specified bit pattern is the register code of a seventh general purpose register, said fifth, sixth, and seventh general purpose registers being pre-specified.

11. In a processor having a plurality of general purpose registers and an instruction register for holding a currently executed instruction, each of said general purpose registers having a register code, said processor being coupled to a memory, said processor having an instruction set, at least an instruction of said instruction set having an operation code (opcode), a destination field, and a source field, said opcode field being unique for said instruction, said destination field selecting the content of a first general purpose register as the destination operand for said instruction, said source field selecting the content of a second general purpose register as the source operand for said instruction, a method of specifying a new source for operands besides said general purpose register for said instruction, said method comprising the steps of:

loading said instruction into said instruction register; and upon recognizing the register code of a third general purpose register in said instruction, outside said opcode, in said instruction register, selecting operand data from said memory to be used as an operand for said instruction, said third general purpose register being pre-specified.

12. The method of claim 11 wherein said selecting operand data comprising selecting immediate data.

13. The method of claim 12 wherein selecting immediate data comprises selecting immediate data located next after said instruction in said memory.

14. The method of claim 11 wherein said selecting operand data from said memory comprises the step of using offset data from said memory as an offset to the content of said third general purpose register to reference said memory for said operand data to be used as an operand for said instruction.

15. The method of claim 14 wherein said using offset data comprises selecting offset data located next after said instruction in said memory.

16. The method of claim 15 wherein said recognizing the register code of a third general purpose register comprises recognizing the register code of said third general purpose register in the source field of said instruction.

17. The method of claim 14 wherein said recognizing the register code of a third general purpose register comprises recognizing the register code of said third general purpose register in the source field of said instruction.

18. The method of claim 11 further comprising the steps of:

providing a special purpose register always having a copy of the content of said third general purpose register; and accessing said special purpose register to indirectly obtain the content of said third general purpose register.

19. A processor comprising:

a plurality of general purpose registers;

an instruction register for holding a currently executed instruction;

a memory; and a decoding means wherein said general purpose registers, instruction register, memory, and decoding means are coupled to one another, said processor having an instruction set, at least an instruction of said instruction set having an operation code (opcode), a destination field, and a source field, said opcode field being unique for said instruction, said destination field selecting the content of a first general purpose register as the destination operand for said instruction, said source field selecting the content of a second general purpose register as the source operand for said instruction, and said decoding means being for recognizing said opcode of said instruction in said instruction register and for recognizing the register code of a pre-specified general purpose register in the source field of said instruction, outside said opcode field, and in response to said recognizing said opcode and said register code in said instruction, for selecting immediate data from said memory to be used as an operand for said instruction.

20. The processor of claim 19 further comprising a special purpose register coupled to said pre-specified general purpose register for storing a copy of said pre-specified general purpose register whereby obtaining the content of said pre-specified general purpose register can be done by accessing said special purpose register.

* * * * *